United States Patent
Houghton et al.

(10) Patent No.: US 11,472,577 B2
(45) Date of Patent: Oct. 18, 2022

(54) NEAR ZERO SHOCK BOLT CATCHER ASSEMBLY

(71) Applicants: Jeanette Ann Houghton, Calgary (CA); Worthington Bowie Houghton, Jr., Calgary (CA)

(72) Inventors: Jeanette Ann Houghton, Calgary (CA); Worthington Bowie Houghton, Jr., Calgary (CA)

(*) Notice: Subject to any disclaimer, the term of this patent is extended or adjusted under 35 U.S.C. 154(b) by 528 days.

(21) Appl. No.: 16/699,402

(22) Filed: Nov. 29, 2019

(65) Prior Publication Data
US 2021/0094707 A1    Apr. 1, 2021

Related U.S. Application Data

(60) Provisional application No. 62/906,239, filed on Sep. 26, 2019.

(51) Int. Cl.
| | |
|---|---|
| *B64G 1/64* | (2006.01) |
| *F16B 41/00* | (2006.01) |
| *F16B 37/14* | (2006.01) |
| *F16B 39/00* | (2006.01) |

(52) U.S. Cl.
CPC ............. *B64G 1/645* (2013.01); *B64G 1/641* (2013.01); *F16B 37/14* (2013.01); *F16B 39/00* (2013.01); *F16B 41/00* (2013.01); *F16B 41/002* (2013.01)

(58) Field of Classification Search
CPC ......... B64G 1/645; B64G 1/641; F16B 37/14; F16B 39/00; F16B 41/00; F16B 41/002; F16B 2031/002; F16B 2031/005
USPC ................... 411/8, 9, 372.5, 372.6, 383, 384
See application file for complete search history.

(56) References Cited

U.S. PATENT DOCUMENTS

| | | | |
|---|---|---|---|
| 4,002,120 A | 1/1977 | Swales et al. | |
| 4,187,759 A | 2/1980 | Toy et al. | |
| 4,213,586 A | 7/1980 | Sengstock, Jr. et al. | |
| 4,290,570 A | 9/1981 | Smolik et al. | |
| 4,300,737 A | 11/1981 | Byrne et al. | |
| 4,303,214 A | 12/1981 | Wittmann et al. | |
| 4,324,374 A | 4/1982 | Wittmann et al. | |
| 4,326,684 A | 4/1982 | Rosen | |
| 4,408,536 A | 10/1983 | Swales et al. | |
| 4,646,102 A | 2/1987 | Akaeda et al. | |

(Continued)

FOREIGN PATENT DOCUMENTS

| | | | | |
|---|---|---|---|---|
| JP | H0215599 U | * | 1/1990 | |
| JP | H10310100 A | * | 11/1998 | ............. B64G 1/645 |
| RU | 2111905 C1 | * | 5/1998 | ............. B64G 1/641 |

*Primary Examiner* — Joshua T Kennedy

(57) ABSTRACT

A bolt catcher and extractor for use with a separation nut and an attaching preloaded bolt that secure a payload to a launch vehicle or spacecraft. The bolt catcher extracts the attaching bolt from the separation nut, pulls it clear of the interface between the launch vehicle or spacecraft and the released payload, and captures it within the bolt catcher housing. The released bolt may have kinetic energy due to the strain energy stored by the pre-release bolt preload. The bolt catcher may have a magnetic eddy current damper that controls the bolt velocity during bolt extraction and dissipates the bolt kinetic energy as heat. The bolt may be magnetically non-impact captured within the bolt catcher. Bolt momentum at the end of the bolt extraction is less than 2% of that of bolt catchers of the prior art. Shock to the released payload or deployable equipment is near zero.

11 Claims, 2 Drawing Sheets

(56) References Cited

U.S. PATENT DOCUMENTS

| | | | |
|---|---|---|---|
| 5,222,569 A | 6/1993 | Martel | |
| 5,603,595 A * | 2/1997 | Nygren, Jr. | B64G 1/645 411/6 |
| 5,810,296 A | 9/1998 | Izumi | |
| 5,887,823 A | 3/1999 | Ziavras et al. | |
| 5,963,182 A | 10/1999 | Bassily | |
| 6,129,315 A | 10/2000 | Benoliel et al. | |
| 6,939,073 B1 * | 9/2005 | Ahmed | F16B 31/00 411/433 |
| 2002/0164204 A1 | 11/2002 | Kaszubowski et al. | |
| 2011/0113605 A1 * | 5/2011 | Plaza Baonza | B64G 1/645 24/591.1 |

* cited by examiner

NEAR ZERO SHOCK BOLT CATCHER ASSEMBLY

BACKGROUND OF THE INVENTION

1. Field of the Invention

The present invention relates to a bolt catcher for use with currently available launch vehicle, spacecraft, and deployable equipment separation nuts or hold down and release mechanisms (here after "separation nut") and bolt assemblies. The bolt catcher extracts the bolt from the separation nut, dissipates the bolt's kinetic energy as heat, and non-impactly captures and retains the bolt within the bolt catcher. Near zero shock to the launch vehicle, spacecraft, or deployed equipment is generated from stopping the bolt within the bolt catcher.

2. Background of the Invention

In launch vehicle and spacecraft applications it is sometimes desirable to hold down payloads or deployable equipment during launch and then release them on command. The hold down function is typically through a preloaded bolt that connects the payload or deployable equipment to the launch vehicle or spacecraft by way of the body of the separation nut. The bolt is typically withdrawn from the separation nut with a bolt catcher that may incorporate a spring to withdraw and capture the bolt and a deformable or crushable cushion to damp the impact of the bolt within the bolt catcher. The hold down operation results in the storage of strain energy proportional to the hold down preload force and the deflections of the separation nut, bolt, bolt catcher, launch vehicle or spacecraft, and payload or deployable equipment structure. During the release operation the stored strain energy is converted to kinetic energy. A portion of the released kinetic energy may be manifested as velocity of the released bolt. A bolt withdrawal spring within the bolt catcher may impart additional velocity and kinetic energy to the bolt. The bolt momentum change when it is stopped by a deformable or crushable cushion may be manifested as impulse and shock to the launch vehicle, spacecraft, or deployable equipment. Such deformable or crushable cushions may have to be replaced before the bolt catcher can be reused. Shock may damage sensitive electronics such as clock oscillators, alignment sensitive optics such as telescopes and star finders, or less robust mechanical mechanisms.

The present invention is a bolt catcher that effectively dissipates most of the bolt kinetic energy at release and energy added to the bolt by an extraction spring as heat in a magnetic eddy current damper. Bolt deceleration during extraction and velocity when fully extracted are minimized. The bolt is non-impactly captured and retained magnetically at the end of the extraction stroke. Unlike bolt catchers that utilize crushable cushions the present invention does not generate debris while catching a bolt.

The present invention can be reused and does not require refurbishment between operations. Its performance will not degrade over time.

The Space Shuttle Solid Rocket Booster was joined to the external tank with an explosive separation bolt. The bolt catcher, mounted on the External Tank, utilized a spiral wound, corrugated aluminum, crushable energy absorbing cushion to absorb the bolt energy. This type of cushion causes high forces and shock when the bolt first contacts the cushion, lower forces and shock after the crushable cushion wall have crippled, and higher forces and shock again as the cushion is crushed to a semi-solid block. NASA has redesigned and strengthened the bolt catcher for future missions.

The "Separation Nut System," U.S. Pat. No. 4,187,759, Toy, et al, assigned to The United States of America as represented by the Secretary of the Navy, claims a pyrotechnically actuated separation nut with an associated bolt catcher. The separation nut incorporates a pyrotechnically driven "pusher" that ejects the bolt from the separation nut. The bolt catcher tube includes internal spring fingers that capture the bolt head within the bolt catcher. No bolt energy dissipation system is provided. Shock when the bolt head is captured within the bolt catcher is high because the bolt stopping time is very short. A similar bolt catcher with internal spring fingers was used on a US ICBM.

The "Flywheel Nut Separable Connector and Method," U.S. Pat. No. 5,603,598, Nygren, Jr., assigned to Martin Marietta Corp., claims an optional bolt catcher incorporating a spring to catch and retain an attaching member and a damper to absorb the impact of the attaching member. The velocity of the attaching member at impact is relatively high due to the 5,000 rpm flywheel and one inch thread lead plus the velocity added by the bolt catcher spring. No provision is made to dissipate the kinetic energy and slow the attaching member prior to its impact with the damper. Generated shock from the bolt catcher is relatively high because of the impact velocity and short damper compliance distance and attaching member short stopping time.

The "Integrated Restraint/Release/Deployment Initiation Device," U.S. Pat. No. 5,810,296, Izumi, assigned to TRW Inc., includes a purchased non-explosive separation nut and a separation bolt. A bolt catcher is claimed. The bolt catcher consists of a tubular body, a spring to extract and capture the bolt, and crushable material to absorb the released separation bolt energy. No provision is made to dissipate the separation bolt kinetic energy and slow the separation bolt prior to its impact with the crushable material. Generated shock from the bolt catcher is relatively high because the crushable material crush distance and separation bolt stopping time are short.

There are other US patents that reference bolt catchers without claims, including U.S. Pat. Nos. 5,522,569, 5,887,823, and 6,129,315. They generally refer to a tubular body, a spring to extract the bolt from a separation nut and capture the bolt within the tubular body, and a crushable or resilient pad to damp the impact of the bolt within the tubular body.

None of these implementations of prior art incorporates an efficient energy dissipating mechanism or system within the bolt catcher. As a result, there is shock generation associated with stopping the bolt released by a separation nut, or other release device, within a prior art bolt catcher.

SUMMARY OF THE INVENTION

One embodiment of the present invention is a bolt catcher to be used in conjunction with a separation nut, or other release device, and a preloaded bolt, or other fastener, for holding payloads and/or deployable equipment secure against vibration during launch by launch vehicles (aircraft, rockets, or missiles), and upon release of the preloaded separation nut dissipating the strain energy stored in the separation nut, bolt, and surrounding structure as heat so that near zero shock is generated by stopping the bolt. The bolt catcher may have elements that dissipate kinetic energy as heat and control the velocity of the bolt extraction from a separation nut or other release device. The bolt extractor has elements that pull the bolt from the hold down and release mechanism, control the bolt extraction velocity, dissipate the bolt kinetic energy as heat, and capture the bolt in a non-impact manner at full extraction.

The force generated when the bolt catcher stops the bolt plus bolt catcher moving mass is a function of the bolt plus bolt catcher mass and velocity and their stopping distance where $$F \text{ stopping force} = \frac{\text{mass} \times \text{velocity}^2}{\text{stopping distance}}.$$

In the case where a 0.375 inch diameter bolt, preloaded to 10,000 pounds, is extracted 2.375 inches and a prior art bolt catcher stops the bolt linearly with a cushion in 0.25 inches, the bolt stops in approximately 0.00183 seconds and the average stopping force F is approximately 135 pounds. The present invention slows the same preloaded bolt with a magnetic eddy current damper to a stop in 2.375 inches, the bolt stops in approximately 0.065 seconds, the maximum stopping force is less than 4 pounds, and the average stopping force is 1.43 pounds, or less than 0.9% of the force of a prior art bolt catcher. The bolt momentum at the end of the bolt end of the bolt extraction in the present invention is less than 2% of that of bolt catchers of the prior art. The calculations can be readily duplicated by those ordinarily skilled in the art.

DETAILED DESCRIPTION OF THE INVENTION

Figure 1:
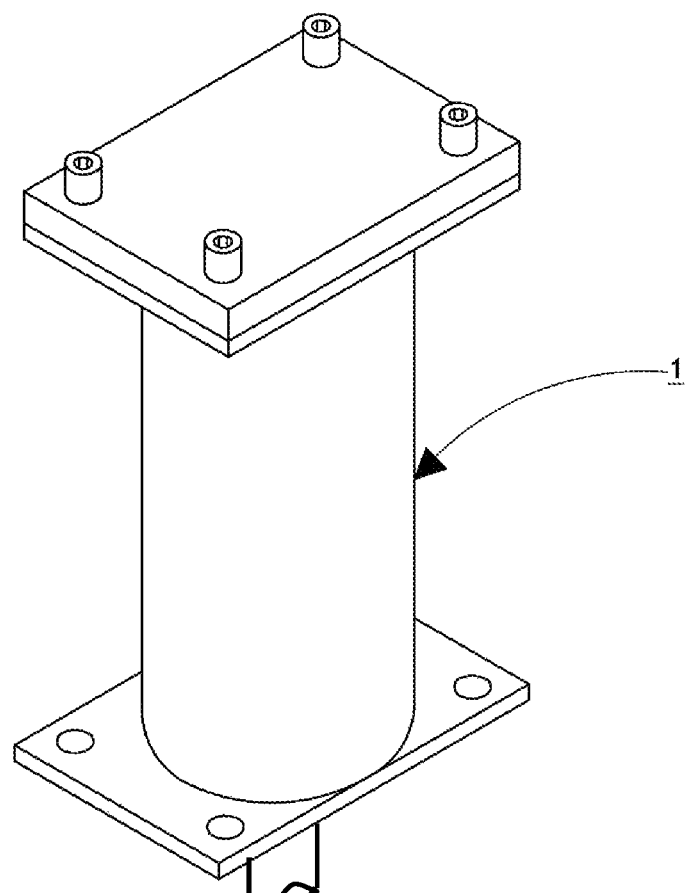
FIG. 1 is an isometric view of the bolt catcher assembly 1.

FIG. 1 is an isometric drawing of the bolt catcher assembly 1 that shows the device overall configuration, features that attach the bolt catcher to the payload or deployable equipment, the bolt that attaches the bolt catcher to a separation nut or other release device, and the cover that enables access to tighten and preload the bolt.

Figure 2:
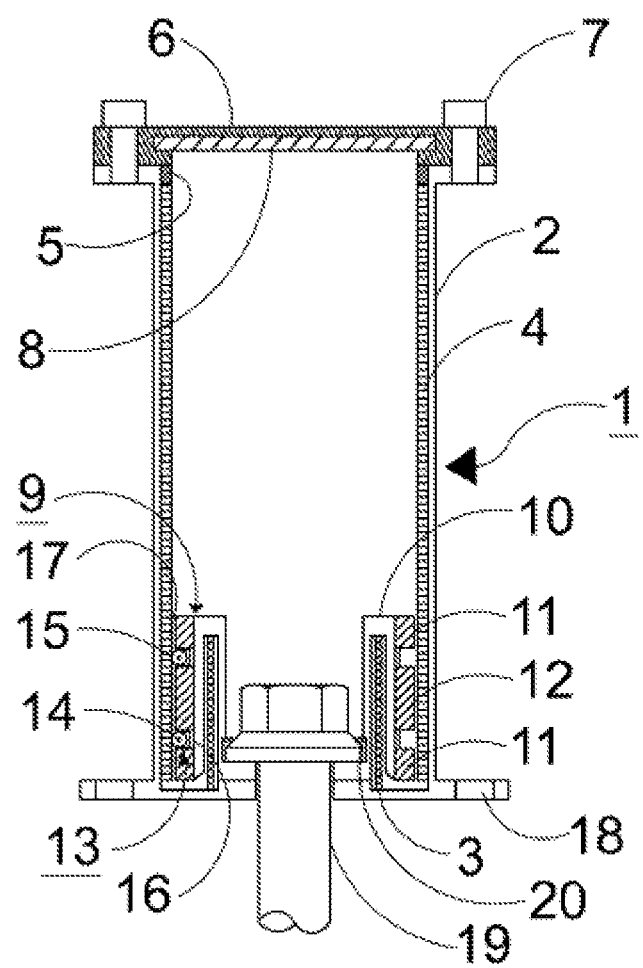
FIG. 2 is a cross-sectional view of the bolt catcher assembly 1.

FIG. 2 is a cross-sectional view of the bolt catcher assembly 1. In a preferred embodiment of the present invention the bolt catcher 1, FIG. 2, housing 2 is fabricated from ferromagnetic steel, supports a non-magnetic, electrically conductive damping element 4, and the capture ring 5 that is fabricated from ferromagnetic steel. Cover 6 is fabricated from non-magnetic material and supports a resilient damping pad 8. The damping element 4, capture ring 5, and pad 8 are bonded to housing 2 and cover 6 with suitable adhesives. Cover 6 is fastened to housing 2 with screws 7. The head of bolt 19 is captured within the magnet cup assembly 9 and held in place with snap ring 20. In the preferred embodiment of the present invention magnet cup assembly 9 consists of cup 10 fabricated from ferromagnetic steel, two narrow magnet rings 11, one wide magnet ring 12, and a plurality of nonmagnetic roller guide assemblies 13 comprising a roller carrier ring 16, rollers 14, and roller pins 15. The magnets may be fabricated from neodymium boron iron or other magnetic material at the discretion of the designer. The magnet rings 11 and 12 and roller guide assemblies 13 may be bonded in place using a suitable adhesive.

In the preferred embodiment of the present invention, when a separation nut is locked and preloaded, the bolt 19 is in the position as shown in FIG. 2 and the extractor spring 3 is compressed. After the bolt 19 is released by a separation nut, post-release residual bolt velocity and the spring 3 cause the bolt 19 to be extracted from the separation nut and drawn into the bolt catcher 1, FIGS. 1 & 2. The extractor spring 3 is guided by magnet cup assembly 9 and the circular recess in the bottom of housing 2.

Magnetic flux flows from the north pole, or outer end of wide magnet 12, across the gaps 17, through the damping element 4, through the housing 2, back through damping element 4, across the gaps 17, into each of the south poles of the two narrow magnet rings 11, through the cup 10, and back to the south pole of magnet 12. Other magnetic circuit configurations may occur to those skilled in the art.

The relative motion between the magnet cup assembly 9 and damping element 4 induces circumferential electrical currents in the damping element 4. The magnetic fields of the induced currents oppose the magnet cup assembly 9 magnetic fields which results in damping forces that oppose the motion of the magnet cup assembly 9.

In the preferred embodiment of the present invention the instantaneous eddy current damping force on the magnet cup assembly 9 at each of the magnetic gaps can be calculated from the equation $$F = \frac{B^2 l^2}{R} v$$

where F, damping force, is in Newtons, B, magnetic flux in damping element 4, is in Tesla, I, damper element 4 electrical circuit length, is in meters normal to the magnetic flux and the linear velocity of the linearly moving magnetic flux, R, electrical resistance of the damping element 4 at each magnetic circuit, is in ohms, and v, instantaneous linear velocity of the magnet cup assembly 9, is in meters/second. The total damping force, $F_{total}$, on magnet cup assembly 9 is the sum of the forces developed at each of the magnets and is a function of magnet cup assembly 9 instantaneous velocity and magnetic flux and damping element circumferential electrical length and resistance at each magnet cup assembly 9 position during bolt 19 extraction.

The energy dissipated by the eddy current damper is then $$E = \int F_{total} dx$$

where E, dissipated energy, is in Newton-meters and x, magnet assembly 9 differential linear travel, is in meters.

The preferred embodiment of the bolt catcher 1 shown in FIGS. 1 & 2 may be used with separation nuts in which the velocity of a released bolt is very low or with separation nuts in which the bolt velocity at release is very high. In applications in which the released bolt velocity is very low, the bolt catcher 1, FIG. 2, may have a cylindrical homogeneous magnetic material housing 2 and cylindrical homogeneous conductive material damping element 4 so that the damping force on magnet cup assembly 9 is solely dependent upon the magnet assembly 9 velocity and is very low over the bolt 19 extraction stroke. In applications in which the released bolt velocity is very high the damping force F may be very high at the start of the bolt 19 extraction stroke and cause shock to the released payload or deployed equipment. To reduce the damping force F at the beginning of the bolt 19 extraction stroke, and linearize the damping force over the extraction stroke, the bolt catcher 1, FIG. 2, may have a variable thickness magnetic material housing 2 and variable thickness conductive material damping element 4 so that the damping force on magnet assembly 9 is a function of the magnet assembly 9 velocity, flux density B, and damping element 4 electrical resistance R and circuit length l at any position in the bolt 19 extraction stroke. Linearization of the damping force F decreases and linearizes the deceleration of magnet cup assembly 9 and bolt 19 and increases their stopping time so that shock to the released payload or deployable equipment is minimized. Alternatively, damping element 4 and housing 2 may be fabricated from non-homogeneous materials to achieve reduction and linearization of magnet assembly 9 and bolt 19 deceleration.

The bolt 19 and magnet cup assembly 9 deceleration, velocity, time, distance traveled, and energy dissipation can be solved for by numeric integration of the equations or by simulation software. The metric units may be converted to English units, or vice-versa, for consistency in the calculations at the discretion of the analyst. The present invention design and analyses can be readily performed by anyone skilled in physics and magnetics design and analysis.

At the top end of the magnet cup assembly 9 extraction stroke there is a reduced diameter capture ring 5, fabricated from ferromagnetic steel, and bonded into the housing 2. When the top edge of the upper magnet ring 11 is approximately aligned with the top edge of the capture ring 5 the total magnetic flux from magnet ring 11 is at a maximum and the magnet cup assembly 9 is captured by the magnetic field.

If the upper magnet ring 11 extends beyond the upper end of the capture ring 5, the total magnetic flux is decreased, and the magnetic attraction between upper magnet ring 11 and the capture ring 5 acts to further slow the magnet cup assembly 9 and pull upper magnet ring 11 and the capture ring 5 back into approximate alignment. Similarly If the upper magnet ring 11 is below the upper end of the capture ring 5, the total magnetic flux is decreased, and the magnetic attraction between upper magnet ring 11 and the capture ring 5 acts to pull upper magnet ring 11 and the capture ring 5 back into approximate alignment. In this manner the capture ring 5 and the extractor spring 3 act as retention devices to hold the magnet cup assembly 9 and the bolt 19 in their fully extracted position. The magnetic detent and retention system is non-contact so that near zero shock is generated when stopping the magnet cup assembly 9 and the bolt 19. Resilient pad 8 is included to damp shock that might otherwise result from magnet cup assembly 9 striking the cover 6 in the event of magnet cup assembly 9 and bolt 19 overtravel during extraction or during environmental vibration exposure.

During bolt 19 extraction magnet assembly 9 is attracted to the housing 2 which would cause rubbing and friction and possibly stall bolt 19 extraction. To minimize friction the preferred embodiment of bolt catcher assembly 1 incorporates a plurality of roller guide assemblies, 13, each consisting of a non-magnetic carrier ring 16 that supports three non-magnetic rollers 14 that rotate on non-magnetic roller pins 15. The roller pins 15 may be fabricated with a head on one end, pressed into place in rings 16, and staked or otherwise deformed on the other end to positively retain them.

Other antifriction guide configurations, including sliding contact guides, may be employed to improve extraction stability or reduce weight at the discretion of the designer.

The bolt extractor 1, FIGS. 1 & 2, may have other magnet 11 and 12, damping element 4, and mechanical configurations to improve performance or save weight.

The bolt extractor 1 does not need to be reset or refurbished. The cover 6 must be removed so that the bolt 19 can be screwed into a separation nut and retorqued. After retorquing bolt 19 the cover 6 must be reinstalled.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A bolt catcher assembly, comprising:
a bolt catcher affixed to a first body;
a bolt having a bolt head, said bolt securing said bolt catcher and said first body to a selectively releasable separation nut affixed to a second body;
wherein a preload force loop is established within said bolt, said bolt catcher, said first body, said separation nut, and said second body when said bolt is torqued;
said bolt catcher further comprising:
a housing assembly;
a cover assembly;
a cup assembly that engages said bolt head;
an extractor spring that engages said cup assembly;
a magnetic eddy current damper;
a magnetic retention circuit ferromagnetic capture ring;
wherein said extractor spring drives a release of said cup assembly and extraction of said bolt from said separation nut and pulls said bolt into said bolt catcher;
wherein during the extraction, said magnetic eddy current damper dissipates a kinetic energy in said bolt and the potential energy of said extractor spring as heat; and
wherein said capture ring non-impactly stops a motion of said cup assembly and said bolt and captures and retains said bolt within said bolt catcher.

2. The bolt catcher assembly as in claim 1, wherein
a potential strain energy stored within said preload force loop is proportional to a sum of a force on and the deflection of each of the elements of said preload force loop;
said potential strain energy is released when said separation nut is released;
a kinetic energy in and a velocity of said bolt that manifests said released potential strain energy.

3. The bolt catcher assembly as in claim 1, wherein said housing assembly comprises:
a housing fabricated from a magnetic material;
an electrically conductive energy dissipation element, a circumferential resistance of which may vary with position over an axial length of said electrically conductive energy dissipation element affixed to an inside diameter of said housing;
a plurality of magnetic flux paths within said housing, a magnetic reluctance of which may vary with position over the axial length of said housing;
said ferromagnetic capture ring affixed to the inside diameter of said housing;
a plurality of mounting features that secure said bolt catcher to said first body;
a hole in a base of said housing that permits insertion of said bolt.

4. The bolt catcher assembly as in claim 3, wherein:
said housing may have a linearly or non-linearly tapered wall thickness so that said magnetic reluctance of said plurality of magnetic flux paths may be varied over a distance of said extraction.

5. The bolt catcher assembly as in claim 3, wherein:
said electrically conductive energy dissipation element may have a linearly or non-linearly tapered wall thickness so that an electrical resistance of a circumferential electrical path may be varied over a distance of said extraction.

6. The bolt catcher assembly as in claim 3, wherein said cup assembly comprises:
a cup fabricated from a magnetic material;
a plurality of radially polarized magnet rings alternately polarized north pole facing radially outwards and south pole facing radially outwards;
a plurality of magnetic flux paths;
a guide for said extractor spring;
at least one non-magnetic guide assembly that guides said cup assembly within said electrically conductive energy dissipation element during said extraction of said bolt, said at least one non-magnetic guide assembly may have either sliding or rolling contact with said electrically conductive energy dissipation element;
a hole in the base of said cup assembly that permits insertion of said bolt;
a snap ring that retains said head of said bolt within said cup assembly;
an interface surface for said head of said bolt that carries said preload force;
an interface surface between said cup assembly and said housing assembly that carries said preload force.

7. The bolt catcher assembly as in wherein an instantaneous magnetic flux, that may vary as a function of the position of said cup assembly within said extraction, flows from said magnet rings radially polarized north pole outwards, radially outwards across a gap that provides mechanical clearance between moving and stationary parts, through said electrically conductive energy dissipation element, axially through said plurality of housing magnetic flux paths, radially inwards back through said energy dissipation element, across said gap, into said adjacent alternately polarized south pole outwards magnet rings, axially through said cup, and back into the south poles of said magnet rings polarized north pole outwards
said instantaneous magnetic flux induces an instantaneous electric current in said electrically conductive energy dissipation element proportional to a geometry of and the resistance of said electrically conductive energy dissipation element and to an instantaneous velocity of said cup assembly and said bolt during said extraction;
said instantaneous induced electric current produces a magnetic field that generates an instantaneous opposing force that opposes and slows the linear motion of said cup assembly and said bolt at any instant following release and during said extraction of said bolt;
said instantaneous opposing force on said cup assembly at each of said magnet rings is calculated from the equation $$F = \frac{B^2 l^2}{R} v$$

where F, instantaneous opposing force, is in Newtons, B, instantaneous magnetic flux density passing through said conductive energy dissipation element, is in Tesla, l, said energy dissipation element instantaneous circumferential electrical circuit length, is in meters, R, circumferential instantaneous electrical resistance of said energy dissipation element at each magnet ring, is in ohms, and v, linear velocity of said cup assembly, is in meters/second; the total instantaneous opposing force, $F_{total}$, on said cup assembly is the sum of said forces developed at each said magnet ring;
said eddy current damper dissipates energy as heat, $$E = \int F_{total} dx$$

where E, dissipated energy, is in Newton-meters and dx, differential linear travel of said cup assembly and said bolt is in meters;
said eddy current damper slows the velocity of said cup assembly and said bolt during said extraction.

8. The bolt catcher assembly as in claim 7, wherein
said magnetic eddy current damper opposing force may be linearized and minimized by resistance optimization of said electrically conductive energy dissipation element and by magnetic reluctance optimization of the plurality of magnetic flux paths.

9. The bolt catcher assembly as in claim 1, wherein said cover assembly comprises:
a cover fabricated from non-magnetic material;
a resilient pad affixed to an inside surface of said cover, said resilient pad damps any impact that might occur if said cup assembly and said bolt over-travel said magnetic retention circuit upon said extraction of said bolt or upon exposure to environmental vibration or shock;
a plurality of fasteners that removably secure said cover assembly to said housing assembly.

10. The bolt catcher assembly as in claim 1 comprising said bolt catcher, wherein:
said bolt may be accessed and retorqued by removing and replacing said cover assembly.

11. The bolt catcher assembly as in claim 1, wherein:
said eddy current damper and said magnetic capture ring allow said bolt catcher to be reusable without necessity to replace or refurbish said eddy current damper or said magnetic capture ring.

\* \* \* \* \*